(12) United States Patent
Kusuura

(10) Patent No.: US 8,845,233 B2
(45) Date of Patent: Sep. 30, 2014

(54) SOIL REMEDIATION

(75) Inventor: Takahisa Kusuura, Kawasaki (JP)

(73) Assignee: Empire Technology Development LLC, Wilmington, DE (US)

( * ) Notice: Subject to any disclaimer, the term of this patent is extended or adjusted under 35 U.S.C. 154(b) by 21 days.

(21) Appl. No.: 13/517,974

(22) PCT Filed: Oct. 13, 2011

(86) PCT No.: PCT/US2011/056161
§ 371 (c)(1),
(2), (4) Date: Jun. 20, 2012

(87) PCT Pub. No.: WO2013/055345
PCT Pub. Date: Apr. 18, 2013

(65) Prior Publication Data
US 2013/0094908 A1    Apr. 18, 2013

(51) Int. Cl.
*B09C 1/02* (2006.01)
*B09C 1/08* (2006.01)
*B01F 15/02* (2006.01)
*B01F 11/02* (2006.01)
*B01F 3/08* (2006.01)
*B01F 3/12* (2006.01)

(52) U.S. Cl.
CPC ............. *B09C 1/08* (2013.01); *B01F 3/0865* (2013.01); *B01F 2215/0454* (2013.01); *B01F 2003/1257* (2013.01); *B01F 15/026* (2013.01); *B01F 11/0266* (2013.01)
USPC ...................................... 405/128.7

(58) Field of Classification Search
USPC ................. 405/128.1, 128.15, 128.45, 128.5, 405/128.7, 128.8, 232, 241, 242, 243, 249, 405/255; 166/165, 166, 167, 168, 242.1, 166/231, 19, 171, 177
See application file for complete search history.

(56) References Cited

U.S. PATENT DOCUMENTS

| | | | | |
|---|---|---|---|---|
| 3,864,923 A | * | 2/1975 | Turzillo .................... | 405/238 |
| 4,027,490 A | * | 6/1977 | Stade et al. ................ | 405/237 |
| 4,312,762 A | * | 1/1982 | Blackburn et al. .......... | 210/768 |
| 4,637,758 A | * | 1/1987 | Tamaki et al. .............. | 405/232 |
| 4,750,571 A | * | 6/1988 | Geeting ...................... | 175/57 |
| 5,152,639 A | * | 10/1992 | Visconti .................... | 405/240 |
| 6,250,846 B1 | | 6/2001 | Kawabata et al. | |
| 6,863,475 B2 | | 3/2005 | DeVaull, III et al. | |
| 7,118,631 B2 | | 10/2006 | Taylor-Smith et al. | |
| 7,226,246 B2 | * | 6/2007 | Fox ........................... | 405/240 |

(Continued)

FOREIGN PATENT DOCUMENTS

| | | |
|---|---|---|
| JP | 2004-097912 | 4/2004 |
| JP | 2008-000731 | 1/2008 |
| JP | 2008-307539 | 12/2008 |
| WO | WO 2005/080745 | 9/2005 |

OTHER PUBLICATIONS

International Search Report and Written Opinion received in PCT Patent Application PCT/US2011/056161 dated Jan. 19, 2012.

(Continued)

*Primary Examiner* — Frederick L Lagman
(74) *Attorney, Agent, or Firm* — Knobbe, Martens, Olson & Bear LLP

(57) ABSTRACT

A device for agitating a material is provided. The device includes a casing that includes an opening at a first end and a valve configured to open and close the opening.

27 Claims, 6 Drawing Sheets

(56) References Cited

U.S. PATENT DOCUMENTS

| | | | | |
|---|---|---|---|---|
| 7,546,887 | B2* | 6/2009 | Schwab | 405/241 |
| 2003/0221870 | A1* | 12/2003 | Johnson, Jr. | 175/71 |
| 2004/0170477 | A1* | 9/2004 | Fox et al. | 405/233 |
| 2006/0051162 | A1* | 3/2006 | Chesner et al. | 405/128.15 |
| 2008/0044237 | A1* | 2/2008 | Okita | 405/258.1 |
| 2010/0326733 | A1 | 12/2010 | Anderson | |

OTHER PUBLICATIONS

Cast Iron from Wikipedia (in English); http://en.wikipedia.org/wiki/Cast iron; in some form no later than Aug. 26, 2011. While a copy of the website as it existed on Aug. 26, 2011, is not in Applicant's possession, Applicant has provided a copy of the website that was printed on Sep. 14, 2011.

Cast Iron (in Japanese) "Casting database" in "Processing technology database" from the web site of The National Institute of Advanced Industrial Science and Technology (AIST); http://unit.aist.go.jp/dmrc/db☐dmrc/casting/gairon/text 06.htm; in some form no later than Aug. 26, 2011. While a copy of the website as it existed on Aug. 26, 2011, is not in Applicant's possession, Applicant has provided a copy of the website that was printed on May 7, 2012.

Lost-wax technology from the web site of Castem Group (in Japanese); http://www.castem.co.jp/lostwax/tech.html; in some form no later than Aug. 26, 2011. While a copy of the website as it existed on Aug. 26, 2011, is not in Applicant's possession, Applicant has provided a copy of the website that was printed on Sep. 14, 2011.

Lost-wax casting from Wikipedia (in English); http://en.wikipedia.org/wiki/Lost_wax_casting; in some form no later than Aug. 26, 2011. While a copy of the website as it existed on Aug. 26, 2011, is not in Applicant's possession, Applicant has provided a copy of the website that was printed on Sep. 15, 2011.

Butterfly valve catalogue from the website of suiryoku.com; http://www.suiryoku.com/g_v/v_butter/butter.html; in some form no later than Aug. 26, 2011. While a copy of the website as it existed on Aug. 26, 2011, is not in the Applicant's possession, Applicant has provided a copy of the website that was printed on Sep. 15, 2011.

Machines from web site of Hokushin Sangyo Co., Ltd. (in Japanese); http://www.hokusins.co.jp/machine/; in some form no later than Aug. 26, 2011. While a copy of the website as it existed on Aug. 26, 2011, is not in Applicant's possession, Applicant has provided a copy of the website that was printed on Sep. 15, 2011.

Mitsubishi crawler drill MDC10 II from the website of Ems Co., Ltd. (in Japanese); http://www.ems☐esd.co.jp/lineup/mitsubishi/mcd102.html; in some form no later than Aug. 26, 2011. While a copy of the website as it existed on Aug. 26, 2011, is not in Applicant's possession, Applicant has provided a copy of the website that was printed on May 7, 2012.

Furukawa PCR200 crawler drill from the web site of The Sunway Group (in English); http://www.sunway.com.my/swent88/product2.html; in some form no later than Aug. 26, 2011. While a copy of the webiste as it existed on Aug. 26, 2011, is not in Applicant's possession, Applicant has provided a copy of the website that was printed on Sep. 15, 2011.

Vibro Hammers—Crane Suspended—Müller from the website of ThyssenKrupp Steelcom NZ (in English); http://www.tk-steelcom.co.nz/vibro-hammers-crane-suspended-muller.htm; in some form no later than Aug. 26, 2011. While a copy of the website as it existed on Aug. 26, 2011, is not in Applicant's possession, Applicant has provided a copy of the website that was printed on May 7, 2012.

Agricultural spray pump from the website of Kudira, a specialty farm equipment supplier (in Japanese); http://www/kudira.net/SHOP/km25.html; in some form no later than Aug. 26, 2011. While a copy of the website as it existed on Aug. 26, 2011, is not in Applicant's possession, Applicant has provided a copy of the website that was printed on Sep. 15, 2011.

Air vacuum pump, from the website of Aqua System Co., Ltd.; http://www.aqsys.co.jp/news/8/ja/%E3%80%8A%E3%82%A8%E3%82%A2%E3%83%90%E-3%82%AD%E3%83%A5%E3%83%BC%E3%83%A0%E3%-83%9D%E3%83%B3%E3%83%97%E3%80%8B.htm; in some form no later than Aug. 26, 2011. While a copy of the website as it existed on Aug. 26, 2011, is not in Applicant's possession, Applicant has provided a copy of the website that was printed on Sep. 15, 2011.

Liquefaction (in Japanese); http://www.arc.ynu.ac.jp/usr004/lecture/gairon/H13/gairon13.htm; in some form no later than Aug. 26, 2011. While a copy of the website as it existed on Aug. 26, 2011, is not in Applicant's possession, Applicant has provided a copy of the website that was printed on Sep. 15, 2011.

Soil liquefaction from Wikipedia (in English); http://en.wikipedia.org/wiki/Soil_liquefaction; in some form no later than Aug. 26, 2011. While a copy of the website as it existed on Aug. 26, 2011, is not in Applicant's possession, Applicant has provided a copy of the website that was printed on Sep. 15, 2011.

Liquefaction Intensity Characteristics of Sand Based on Shaking Table Test (in Japanese); Katsuhiko Oka, Osaka City University, Department of Urban Engineering, Laboratory of Geotechnical. Engineering http://geo.civil.eng.osaka☐cu.ac.jp/ronbun/soturonpdf/02oka.pdf; in some form no later than Aug. 26, 2011. While a copy of the website as it existed on Aug. 26, 2011, is not in Applicant's possession, Applicant has provided a copy of the website that was printed on Sep. 15, 2011.

Mizuno et al., Dynamic Behavior of Pile Foundation of Liquefaction Process—Shaking Table Tests Utilizing Big Shear Box, 12th World Conference on Earthquake Engineering (12WCEE2000) (in English); http://www.iitk.ac.in/nicee/wcee/article/1883.pdf; in some form no later than Aug. 26, 2011. While a copy of the website as it existed on Aug. 26, 2011, is not in Applicant's possession, Applicant has provided a copy of the website that was printed on Sep. 15, 2011.

Earthquake Waveform and Frequency Characteristics from the website of the Japanese Meteorological Research Institute; http://www.mri-jma.go.jp/Publish/Technical/DATA/VOL 26/26 093.pdf; in some form no later than Aug. 26, 2011. While a copy of the website as it existed on Aug. 26, 2011, is not in Applicant's possession, Applicant has provided a copy of the website that was printed on May 7, 2012.

Current and Prospective Soil Decontamination Business (in Japanese), Sumitomo Trust and Banking Co., Ltd., Industrial Research Report No. 14, Sumitomo Trust and Banking, Research Department; http://www.sumitomotrust.co.jp/RES/research/PDF2/Ind14.pdf; in some form no later than Aug. 26, 2011. While a copy of the website as it existed on Aug. 26, 2011, is not in Applicant's possession, Applicant has provided a copy of the website that was printed on Sep. 15, 2011.

Lost-wax technology from the web site of Castem Group (with English Translation); http://www.castem.co.jp/lostwax/tech.html; in some form no later than Aug. 26, 2011. While a copy of the website as it existed on Aug. 26, 2011, is not in Applicant's possession, Applicant has provided a copy of the website that was printed on Sep. 14, 2011.

Machines from web site of Hokushin Sangyo Co., Ltd. (with English Translation); http://www.hokusins.co.jp/machine/; in some form no later than Aug. 26, 2011. While a copy of the website as it existed on Aug. 26, 2011, is not in Applicant's possession, Applicant has provided a copy of the website that was printed on Sep. 15, 2011.

Liquefaction (with English Translation); http://www.arc.ynu/ac/jp/usr004/lecture/gairon/H13/gairon13.htm; in some form no later than Aug. 26, 2011. While a copy of the website as it existed on Aug. 26, 2011, is not in Applicant's possession, Applicant has provided a copy of the website that was printed on Sep. 15, 2011.

Earthquake Waveform and Frequency Characteristics from the website of the Japanese Meteorological Research Institute (with English Translation); http://www.mri-jma.go.jp/Publish.Technical.DATA/VOL 26/26 093.pdf; in some form no later than Aug. 26, 2011. While a copy of the website as it existed on Aug. 26, 2011, is not in Applicant's possession, Applicant has provided a copy of the website that was printed on May 7, 2012.

Butterfly valve catalogue from the website of suiryoku.com; http://www.suiryoku.com/g v/v butter/butter.html; in some form no later than Aug. 26, 2011. While a copy of the website as it existed on Aug. 26, 2011, is not in Applicant's possession, Applicant has provided a copy of the website that was printed on Sep. 15, 2011.

(56) References Cited

OTHER PUBLICATIONS

Mitsubishi crawler drill MCD10 II from the web site of Ems Co., Ltd. (in Japanese); http://www.emsDesd.co.jp/lineup/mitsubishi/mcd102.html; in some form no later than Aug. 26, 2011. While a copy of the website as it existed on Aug. 26, 2011, is not in Applicant's possession, Applicant has provided a copy of the website that was printed on May 7, 2012.

Agricultural spray pump from the website of Kudira, a specialty farm equipment supplier (in Japanese); http://www.kudira.netISHOP/km25.html; in some form no later than Aug. 26, 2011. While a copy of the website as it existed on Aug. 26, 2011, is not in Applicant's possession, Applicant has provided a copy of the website that was printed on Sep. 15, 2011.

Air vacuum pump, from the website of Aqua System Co., Ltd.; http://www.agsys.co.jp/news/Blja/%E3%BO%BA%E3%B2%AB%E3%B2%A2%E3%B3%90%E-3%B2%AD%E3%B3%A5%E3%B3%BC%E3%B3%AO%E3%-B3%9D%E3%B3%B3%E3%B3%97%E3%BO%BB.htm; in some form no later than Aug. 26, 2011. While a copy of the website as it existed on Aug. 26, 2011, is not in Applicant's possession, Applicant has provided a copy of the website that was printed on Sep. 15, 2011.

Cast Iron (in Japanese) "Casting database" in "Processing technology database" from the web site of the National Institute of Advanced Industrial Science and Technology (AIST); http://unit.aist.go.jp/dmrc/dbDdmrc/casting/gairon/text 06.htm; in some form no later than Aug. 26, 2011. While a copy of the website as it existed on Aug. 26, 2011, is not in Applicant's possession, Applicant has provided a copy of the website that was printed on May 7, 2012.

Vibro Hammer from the website of Motoe Corporation (in Japanese); http://www.motoe.jp/vibe/index.html; in some form no later than Aug. 26, 2011. While a copy of the website as it existed on Aug. 26, 2011, is not in Applicant's possession, Applicant has provided a copy of the website that was printed on Sep. 15, 2011.

Liquefaction Intensity Characteristics of Sand Based on Shaking Table Test (in Japanese); Katsuhiko Oka, Osaka City University, Department of Urban Engineering, Laboratory of Geotechnical. Engineering http://geo.civil.eng.osakaDcu.ac.jp/ronbun/soturonpdf/020ka.pdf; in some form no later than Aug. 26, 2011. While a copy of the website as it existed on Aug. 26, 2011, is not in Applicant's possession, Applicant has provided a copy of the website that was printed on Sep. 15, 2011.

Current and Prospective Soil Decontamination Business (in Japanese), Sumitomo Trust and Banking Co., Ltd., Industrial Research Report No. 14, Sumitomo Trust and Banking, Research Department; http://www.sumitomotrust.co.jp/RESIresearch/PDF2/Ind14.pdf; in some form no later than Aug. 26, 2011. While a copy of the website as it existed on Aug. 26, 2011, is not in Applicant's possession, Applicant has provided a copy of the website that was printed on Sep. 15, 2011.

\* cited by examiner

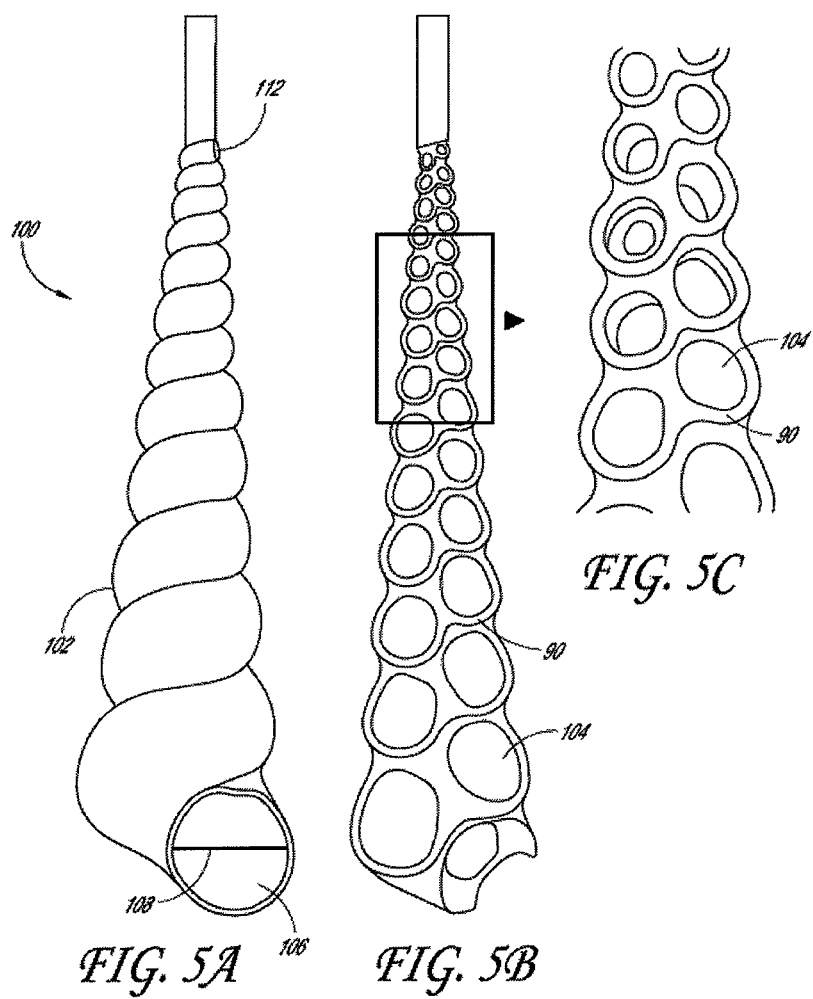

SOIL REMEDIATION

CLAIM FOR PRIORITY

This application is the U.S. national phase entry under 35 U.S.C. §371 of PCT/US2011/056161, filed Oct. 13, 2011, the entire disclosure of which is hereby incorporated by reference herein.

FIELD

The present application relates generally to soil decontamination.

BACKGROUND

Soil contamination can be caused by a variety of things, including for example, the presence of non-naturally occurring substances in the natural soil environment. The contamination can be caused by, for example, leakage from underground storage tanks, usage of pesticides, percolation of contaminated surface water to subsurface strata, oil and fuel dumping, leaching of wastes from landfills and/or direct discharge of industrial wastes to the soil. Some common substances found to contaminate soil include petroleum hydrocarbons, solvents, pesticides, lead and other heavy metals. Soil contamination presents health risks from the contact with the contaminated soil and contaminant vapors and from contamination of water supplies within the soil. Soil contamination can also have detrimental effects on ecosystems and agricultural lands.

SUMMARY

In some embodiments, a device for agitating a material is provided. The device includes a casing which defines a passage that has an opening at a first end of the casing. The device also includes a valve positioned and configured to close the opening. In some embodiments, the casing is configured to allow rotational insertion of the casing into a material. The valve is configured to allow adequate closure of the passage when the casing is in the material. In some embodiments, the casing is configured to be agitated when the casing is in the material.

In some embodiments, a method for agitating a material is provided. The method includes inserting a first end of a casing defining a helical passage into a bulk material to be agitated. The casing includes an opening at the first end of the helical passage. The casing also includes a valve configured to open and close the opening at the first end of the helical passage. The valve is open during inserting so as to allow for a collected volume of the bulk material to pass into the helical passage. The method further includes closing the valve, adding a cleaning fluid into the helical passage, and agitating the casing.

In some embodiments, a device for soil decontamination is provided. The device includes a casing configured to be inserted, by boring, into soil. The casing is adequately liquid-tight when sealed and is configured to transmit vibrations to soil contained within the casing. The device further includes a valve located proximal to a first end of the casing. The valve is configured to effectively seal an interior volume of the casing from an exterior volume surrounding the casing.

The foregoing summary is illustrative only and is not intended to be any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 5A is a drawing depicting a side view of some embodiments of a casing shape.

FIG. 5B is a drawing depicting a sectional view of some embodiments of a casing shape.

FIG. 5C is an enlargement of the drawing of some embodiments of casing shapes from FIG. 5B.

DETAILED DESCRIPTION

Figure 1:
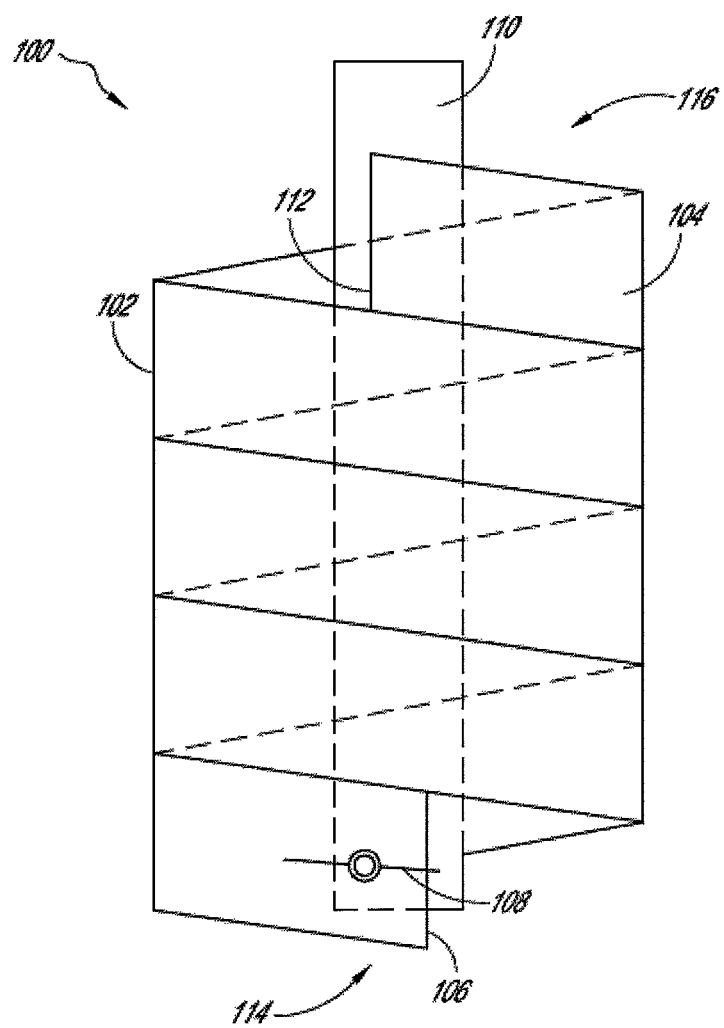
FIG. 1 is a drawing depicting a device for agitating a material according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

In some embodiments, a device for decontaminating material such as soil is provided. In some embodiments, the device includes a casing defining a passage. The passage can include an opening at a first end and, optionally, an opening at a second end. The casing can include a valve positioned at the first end of the casing. The valve can be positioned and configured to adequately close the opening at the first end.

In some embodiments, the casing can be rotationally inserted into a material while the valve is open so that the material enters the passage. The valve can then be closed when the casing is in the material, collecting a portion of the material within the casing. Cleaning fluid (or other substance) can be added to the casing so that it is provided to the material contained within the casing. In some embodiments, the casing can be agitated in a direction substantially parallel to the length of the passage when the casing is in the material, causing the material within the passage to be agitated. The agitation can cause contaminants to detach from particles of the collected materials. In some embodiments, after agitation, the cleaning fluid and any contaminants contained therein can be removed from the passage. In some embodiments, the casing can then be removed from the bulk material.

FIG. 1 depicts some embodiments of a device 100 for agitating a material. In some embodiments, the device 100 can include a casing 102. In some embodiments, the casing 102 can be substantially cylindrical shape. Other shapes are also possible, examples of which are discussed in detail below.

In some embodiments, the casing 102 includes a first opening 106 at a first end 114 of the casing 102. In some embodiments, the casing 102 includes a second opening 112 at a second end 116 of the casing 102. In some embodiments, the first opening 106 and the second opening 112 have the same or similar shapes. In some embodiments, the first opening 106 and the second opening 112 are different shapes. Either or both of the first opening 106 and the second opening 112 can be circular, but other shapes, such as square, triangular, or slit-like, etc. are also possible. In some embodiments the first opening 106 is on a side wall of the casing 102. In some embodiments, the first opening 106 is on an end surface of the casing 102. Other configurations are also relevant. For example, in some embodiments, the first opening 106 can be straddling a sidewall and an end surface of the casing 102. Similarly, in some embodiments, the second opening 112 is on a side wall of the casing 102. In some embodiments, the second opening 112 is on an end surface of the casing 102. Other configurations are also relevant.

In some embodiments, the casing 102 defines a passage 104. In some embodiments, the passage 104 is helical, as shown in FIG. 1. In some embodiments, the pitch of the helix is consistent along the length of the passage 104. In some embodiments, the pitch of the helix varies along the length of the passage 104. Other shapes are also contemplated. For example, the passage 104 can be in a zig-zag or serpentine arrangement. In some embodiments, a multihelix arrangement is also contemplated (e.g., double helix, triple helix, etc.) In some embodiments, the passage 104 is integrated with the casing 102. In some embodiments, the passage 104 is a separate structure from the casing 102. In some embodiments, a portion of the passage 104 is integrated with the casing 102 while another portion of the passage is a separate structure from the casing 102. For example, the passage 104 can be joined to the casing 102 at one or both of the first opening 106 and the second opening 112, but can be a separate structure from the casing 102 along the remainder of the length of the passage 104.

In some embodiments, the passage 104 opens via one or both of the first opening 106 or the second opening 112. In some embodiments, there are more than two openings in the passage and/or casing.

In some embodiments, the device 100 includes a rod 110. In some embodiments, the passage 104 is wound along a length of the rod 110. In some embodiments, the rod 110 is hollow. In some embodiments, the rod 110 is solid. The rod can be in the shape of cylinder. Other shapes are also possible, for example, a rectangular prism. In some embodiments, the surface area of a cross-section of the rod 110 is consistent along the length of the rod 110. In some embodiments, the surface area of a cross-section of the rod 110 varies along the length of the rod 110. The passage 104 can form a helix around the rod 110. The passage 104 can be tightly wound about the rod 110 such that the pitch of the helix is very small or non-existent. The passage 104 can be loosely wound about the rod 110. In some embodiments, the pitch of the helix is consistent along the length of the passage 104. In some embodiments, the pitch of the helix varies along the length of the passage 104. The passage 104 being wound around a rod 110 can advantageously provide the device with strength and resistance to agitation or vibration in a direction along the length of the passage 104.

Any or all of the casing 102, the passage 104, and the rod 110 can include any number of materials. In some embodiments, at least one of the casing 102, the passage 104, and the rod 110 includes iron, cast iron, or carbon steel. Other materials, such as high-speed steel, titanium, carbon-fiber-reinforced polymer, and glass-fiber reinforced polymer are also possible. Materials such as these, with high tensile strength and yield strength, can bear mechanical pressure generated when the device 100 is inserted into a material as well as the stress caused by agitation or vibration. Any or all of the casing 102, the passage 104, and the rod 110 can be formed using one of a number of methods. For example, a helical passage 104 can be formed by pouring iron or cast iron into a mold of a desired shape. Other production methods, such as casting, carbon steel casting, iron casting, or sheet metal processing, are also possible. Certain methods of production, such as casting, can advantageously enable lowcost mass production of components having complex shapes.

The length and cross-sectional area of the casing 102 can determine the amount of material that can be collected and agitated within the casing 102. In some embodiments, the casing is about 0.5 or more meters in length, e.g., 0.5, 1, 2, 3, 4 5, 10, 11, 12, 13, 14, 15, 20, 30, 40, 50, 60, or 100 m or more, including any range defined within any two of these values and any range above or below any one of these values. In some embodiments, the casing is about 0.1 m or more in diameter, e.g., 0.1, 0.2, 03, 0.4, 0.5, 0.6, 0.7, 0.8, 0.9, 1, 2, 3, 4, 5, 6, 7, 8, 9, 10, 15, or 20 meters, including any range defined within any two of these values and any range above or below any one of these values. In embodiments of the device 100 that include a helical passage 104 (e.g., helical passage around a rod or helical passage without a rod), the pitch of the helix can determine the amount of material that can be collected and agitated within the casing 102. In some embodiments, the pitch can be from about 0 cm to 5 cm, from about 5 cm to about 15 cm, from about 15 cm to about 25 cm, from about 25 cm to about 50 cm, or from about 50 cm to about 150 cm. Other pitches are also possible.

In some embodiments, the second opening 112 is in fluid communication with a reservoir. In some embodiments, the second opening 112 is connected by a tube or tubing to a fluid reservoir. In some embodiments, the second opening 112 can be open to the environment, allowing liquid to be poured into the second opening 112. Other configurations for the fluid communication between the reservoir and the second opening 112, such as a pipe or piping, are also possible. In some embodiments, the reservoir is a closed container, such as a tank. In some embodiments, the reservoir is open to the environment.

In some embodiments, the reservoir includes cleaning fluid or other substance (which can be liquid, solid, gas, or plasma). In some embodiments, the cleaning fluid contains a surfactant. In some embodiments, the cleaning fluid is environmentally friendly. In some embodiments, the cleaning fluid is capable of removing hydrophobic contaminants. In some embodiments, the cleaning fluid capable of removing hydrophobic contaminants can be capable of treating both heavy metals and hazardous organics contaminating the material to be treated. In some embodiments, the cleaning fluid is both environmentally friendly and capable of treating both heavy metals and hazardous organics, such as that described in Japanese Patent Application, Publication No. 2008-000731. In some embodiments, materials for absorbing, decomposing, and/or detoxifying heavy metals or other hazardous contaminants can be employed. In some embodiments, the substance added include a bacteria, micro-organism, cell, algae, plant, and/or plant-seed.

In some embodiments, the casing 102 includes a valve 108 positioned such that it is capable of adequately opening and closing the opening 106 at the first end 114 of the casing 102. In some embodiments, the passage 104 includes a valve 108 positioned such that it is capable of adequately opening and closing the opening 106. In some embodiments, the valve is configured to allow closure of the opening 106 while the casing 102 is inserted within a bulk material. In certain such embodiments, the valve 108 is capable of being manipulated at some distance from the location of the valve 108.

In some embodiments, the valve 108 is capable of creating a liquid-tight seal at the opening 106 of the casing 102. In some embodiments, the valve 108 is capable of creating an adequately liquid-tight seal at the opening 106 of the casing 102. In some embodiments, the valve 108 can permit some leakage of liquid. The valve 108 may leak from about 0% to about 5%, from about 5% to about 15%, from about 15% to about 30%, from about 30% to about 45%, from about 45% to about 60%, from about 60% to about 70%, about 70% to about 75%, from about 75% to about 90%, or from about 90% to about 99% of the liquid within the passage. Specific examples of leakage include about 0%, about 5%, about 15%, about 30%, about 45%, about 60%, about 70%, about 75%, about 80%, about 85%, about 90%, about 95%, about 99%, and ranges between any two of these values. In some embodiments, the valve 108 can permit the percentage of leakage previously described over the course of a few seconds, a minute, several minutes, an hour, several hours, a day, or over more than one day. The ability to create some degree of seal using the valve 108 can advantageously minimize adverse effects that are commonly associated with on-site soil decontamination, such as leakage of contaminants into the surrounding material and ground water. In some embodiments, rather than a valve seal, a seal can be effectively created by applying a vacuum to the casing to hold the fluid in the casing. While vibrations of the casing may result in some or much of the fluid leaving the casing, some additional fluid will remain in the casing.

In some embodiments, the valve includes a butterfly valve. A butterfly valve can include a disc positioned in the center of the passage 104 or casing 102. The disc can include a rod connected to an actuator outside of the valve. Rotating the actuator can turn the disc either parallel or perpendicular to the flow within the casing 102 or the passage 104. As described above, the valve can be capable of being manipulated while the casing 102 is inserted in a bulk material. In certain such embodiments, an actuator of the valve 108 can be positioned at some distance from the valve 108. Butterfly valves can advantageously be light in weight and low in cost. Other valve or sealing configurations are also possible, For example, a ball valve, a check valve, or a choke valve can also be used.

In some embodiments, the first end 114 of the casing 102 is configured for insertion into a material to be agitated. In some embodiments, the first end 114 of the casing 102 is tapered so that a surface area of a cross section of the casing 102 taken closer to the first end 114 will be smaller than a surface area of a cross section of the casing 102 taking farther away from the first end 114. In some embodiments, the casing 102 tapers to a point. Other tapered configurations are also possible (see, e.g., FIGS. 5A-5C). For example, the casing 102 can taper towards a rounded surface or flat surface at the first end 114. In some embodiments, the first end 114 can include a structure with a cross-sectional surface area smaller than that of the rest of the casing 102, for example, the first end 114 of the casing 102 can include a cylinder with a cross-sectional area smaller than that of the casing 102. In some embodiments, the first end 114 of the casing is threaded. Threading can advantageously allow for convenient rotational insertion of the casing 102. In some embodiments, the helical passage can provide for a threading aspect on the surface of the casing. In some embodiments, the helical passage and/or the outer surface of the casing is further threaded.

In some embodiments, the first end 114 of the casing 102 includes a material that is structurally rigid enough to allow the first end 114 of the casing 102 to bore into soil or other bulk material. The first end 114 of the casing 102 can include iron, cast iron, titanium, carbon-fiber, carbon steel, high-speed steel, and other materials. Materials such as cast iron can have high tensile strength and high yield strength. These properties can allow the first end 114 of the casing 102 to bear the mechanical pressure generated when the casing 102 is inserted or screwed into soil or bulk material. These properties can also allow the first end 114 of the casing 102 to bear the stress caused by any agitation or vibration applied to the casing 102.

In some embodiments, the device 100 further includes a motor configured to rotate the casing 102 into the soil or other material to be agitated. In some embodiments, the motor is a motor used in a drilling machine. For example, a crawler drill can be used. Other drilling machines, such as a pneumatic drill, and vibro-hammer are also contemplated. The particular type of motor or drilling machine used can be selected based on considerations such as the desired depth of material to be treated, the desired volume of material, the desired area of material to be treated, the level of contamination of the material, and the properties of the material to be treated. For example, the motor being used to rotate the casing 102 into the material should be capable of boring to the desired depth. Crawler drills can advantageously be capable of drilling up to 30 m underground. For deeper depths, pre-processing of the soil or material can be useful (such as boring). In some embodiments, for deeper soil or for firm ground (soil including rock or firm ground made of rock), it can be useful to employ tooth-like projections at the bottom (lowest part) of casing. In some embodiments, the tooth-like projections can be placed on the lower end of the casing. In some embodiments, the tooth-like projections can be placed immediately on the lower end of the case (e.g., right next to the opening). In some embodiments, the tooth-like projections can be placed on a section that is just lower than the lower opening, so that the projections can grind and/or break-up some of the material first, allowing for the loosened soil to more readily enter the casing.

In some embodiments, the device 100 includes a cleaning fluid within at least a portion of the passage 104. The device 100 can include a cleaning fluid within less than about 5%, less than about 10%, less than about 20%, less than about 30%, less than about 40%, less than about 50%, less than about 60%, less than about 70%, less than about 80%, less than about 90%, or less than about 99.9% of the passage 104 and/or casing. In some embodiments, the device 100 includes a cleaning fluid within the entire length of the passage that is within the material. In some embodiments, at least a portion of the cleaning fluid is positioned along the bottom inside surface of the passage and/or casing. In some embodiments, a majority of the cleaning fluid is positioned along the bottom inside surface of the passage 104. In some embodiments, at least a portion of the cleaning fluid is positioned within the material collected within the passage and/or casing. In some embodiments, the majority of the cleaning fluid is positioned within the material collected within the passage and/or casing. In some embodiments, at least a portion of the cleaning fluid is positioned near the top inside surface of the passage and/or casing. In some embodiments, a majority of the cleaning fluid is positioned near the top inside surface of the passage and/or casing. In some embodiments, a portion of the cleaning fluid is located at least on the bottom inside surface of the passage 104, within the material collected in the passage 104, or near the top inside surface of the passage 104.

In some embodiments, the device 100 further includes soil. The device can also include other materials, such as sand, mud, salt, or other materials. In some embodiments, the soil or other material is positioned within the passage and/or casing. In some embodiments, a portion of the passage and/or casing includes soil or another material. The soil or other material can be within from about 0% to about 5%, about 5% to about 15%, about 15% to about 25%, about 25% to about 50%, about 50% to about 75%, or from about 75% to about 99.9% of the passage and/or casing. Specific values include about 0%, about 5%, about 15%, about 30%, about 45%, about 60%, about 70%, about 75%, about 80%, about 85%, about 90%, about 95%, about 99%, and ranges between any two of these values. In some embodiments, substantially all of the passage and/or casing includes soil or another material.

In some embodiments, the device 100 further includes at least one pump configured to pump the cleaning fluid into the passage 104. The pump can be capable of injecting, spraying, or conveying liquid. In some embodiments, an agricultural spray pump is used. In some embodiments, the pump is in fluid communication with the second opening 112 of the casing 102. In some embodiments, the pump is in fluid communication with a reservoir which is in fluid communication with the second opening 112, as described above.

In some embodiments, the device 100 further includes at least one motor configured to agitate or vibrate the passage 104. In some embodiments, the motor includes a vibration or vibro hammer, such as that offered by ThyssenKrupp Steelcom. Such an agitating system can advantageously also be used for inserting and removing the device 100 as it can aid in softening or loosening the material before or during insertion or removal.

In some embodiments, the device 100 further includes at least one pump configured to collect cleaning fluid from the passage 104. In some embodiments, the pump is configured to collect at least a portion of cleaning fluid from the passage and/or casing. The pump can be configured to collect from about 0 to about 5%, from about 5% to about 10%, from about 10% to about 15%, from about 15% to about 20%, from about 20% to about 25%, from about 25% to about 30%, from about 30% to about 35%, from about 35% to about 40%, from about 40% to about 45%, from about 45% to about 50%, from about 50% to about 55%, from about 55% to about 60%, from about 60% to about 65%, from about 65% to about 70%, from about 70% to about 75%, from about 75% to about 80%, from about 80% to about 85%, from about 85% to about 90%, from about 90% to about 95%, or from about 95% to about 99.9% of the cleaning fluid in the passage and/or casing. In some embodiments, the pump is configured to collect substantially all of the cleaning fluid from the upper portion (e.g., upper half and/or approximately at ground level) of the passage and/or casing.

In some embodiments, the pump is configured to collect cleaning fluid from the passage and/or casing. In some embodiments, the pump is configured to collect cleaning fluid and a first contaminant present in the collected volume of material within the passage and/or casing. In some embodiments, the pump is configured to collect cleaning fluid and multiple contaminants present in the collected volume of material within the passage and/or casing. In some embodiments, the collected cleaning fluid can contain at least some of the collected material within the passage and/or casing.

The pump can be configured to collect cleaning fluid from the passage and/or casing can be a pump used to collect fluids at factories or construction sites. In some embodiments, the pump includes an air vacuum pump.

Figure 2:
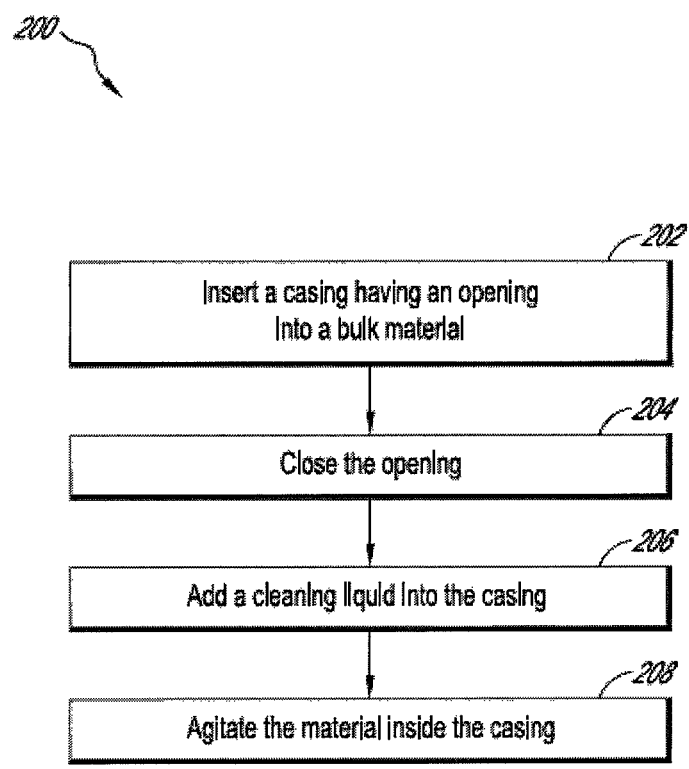
FIG. 2 depicts a flow chart outlining some embodiments for agitating a material.

FIG. 2 depicts an embodiment of a method 200 for agitating a material. The method 200 includes insertion of a casing including an opening into a bulk material (block 302). The method 200 can further include closing the opening (block 204). The method 200 can further include adding the cleaning fluid into the casing (block 206). The method 200 can also include agitating the material inside the casing (block 208).

One skilled in the art will appreciate that, for this and other processes and methods disclosed herein, the functions performed in the processes and methods can be implemented in differing order. Furthermore, the outlined steps and operations are only provided as examples, and some of the steps and operations can be optional, combined into fewer steps and operations, or expanded into additional steps and operations without detracting from the essence of the disclosed embodiments.

In some embodiments, the agitation includes moving the casing in a direction substantially parallel to a length of the passage. For example, if the casing were inserted into the material such that the casing was generally perpendicular to a horizontal surface of the material, the casing can be agitated in a substantially vertical direction. In some embodiments, the methods of soil decontamination include vibrating soil in order to facilitate the collection of water or other liquid containing contaminants by increasing the fluidity of the surrounding liquid.

In some embodiments, vibrating the soil outside of the casing would impart vibration to the surrounding soil. Such an approach may result in vibration pollution, the dispersion of contaminants to unexpected areas, and sinking of the surrounding ground caused by an increase in the water fluidity. However, by using a casing and/or valve, agitating the casing (e.g., in a direction substantially parallel to a length of the passage), the agitation or vibration imparted to surrounding soil outside of the collected volume in the passage can be reduced.

In some embodiments, agitating the casing includes agitating the passage in a direction substantially parallel to a length of the passage at a first level of agitation and the agitating the passage in a direction substantially parallel to the length of the passage at a second level of agitation, wherein the second level of agitation is greater than the first level of agitation. In some embodiments, agitating the casing at a first level of agitation can aid in separating contaminants from particles of the bulk material through forces of friction. In some embodiments, agitating can create new spaces between the particles, change the size of existing spaces between the particles, and damage the framework of the cohesive material. In some embodiments, the effects of agitation can cause the particles to collide with or grind against one another, which can aid in detaching contaminants attached to the surface of the material particles from the particles. In some embodiments, this first level of agitation can include a force which is sufficiently small to ensure that liquefaction does not occur.

After being agitated at an agitation level configured to facilitate detachment of contaminants from material particles, the casing can be agitated at an agitation level configured to induce liquefaction within the material. In some embodiments, inserting the first end of the casing into the bulk material can increase the porosity or proportion of air content of the material. Adding a cleaning fluid can increase the water or fluid content of the material. In some embodiments, agitating or vibrating the casing using a sufficient force can induce liquefaction by causing the water or fluid pressure within the material in the casing to increase which can cause the liquid to be discharged from the top surface of the material. The force and frequency of agitation required to induce liquefaction can depend on variables such as the nature of material to be treated, the desired volume of material to be treated, and the density of material to be treated. The liquid flow generated by liquefaction can advantageously travel along the top inner surface of the passage and/or casing to the surface of the bulk material.

In some embodiments, agitating the casing is performed using a motor. In some embodiments, the motor includes a vibration or vibro hammer, such as that offered by Thyssen-Krupp Steelcom. Such an agitating system can also be used for inserting and removing the device 100 as it can aid in softening the material before or during insertion or removal. Other motors are also possible, e.g., an unbalanced rotor (e.g., a rotary-vibratory drill), a hydraulic add-on vibrator, and/or an electro-mechanical device (such as an electrodynamic shaker).

In some embodiments, adding a cleaning fluid is performed by adding a cleaning fluid through an opening 112 at a second end 116 of the casing 102. In some embodiments, adding a cleaning fluid is performed using a pump. In some embodiments, the device 100 further includes a pump configured to pump a cleaning fluid into the passage 104. The pump can be capable of injecting, spraying, or conveying liquid. In some embodiments, an agricultural spray pump is used. In some embodiments, the pump is in fluid communication with the second opening 112 of the casing 102.

In some embodiments, adding a cleaning fluid to the passage 104 provides cleaning fluid to the collected volume of bulk material. In some embodiments, a portion of the cleaning fluid added into the passage and/or casing may leak into the bulk material, e.g., from about 0% to about 10%, from about 10% to about 20%, from about 20% to about 30%, from about 30% to about 40%, from about 40% to about 50%, from about 50% to about 60%, from about 60% to about 70%, from about 70% to about 80%, from about 80% to about 90%, and from about 90% to 99% of the cleaning fluid added into the passage 104 can leave the passage and/or casing to leak into the material. Specific examples of percentages include about 0%, about 5%, about 10% about 15%, about 20%, about 30%, about 45%, about 50%, about 60%, about 70%, about 75%, about 80%, about 85%, about 90%, about 95%, about 99%, and ranges between any two of these values.

In some embodiments, the method 300 further includes removing at least some of the cleaning fluid from the passage 104. Removal of at least some of the cleaning fluid from the passage 104 can include removing from about 0% to about 10%, from about 10% to about 20%, from about 20% to about 30%, from about 30% to about 40%, from about 40% to about 50%, from about 50% to about 60%, from about 60% to about 70%, from about 70% to about 80%, from about 80% to about 90%, or from about 90% to about 99.9% of cleaning fluid from the passage 104.

In some embodiments, removal of at least some of the cleaning fluid from the passage and/or casing also removes at least some of a first contaminant present in the collected volume of bulk material. Removal of at least some of the cleaning fluid from the passage and/or casing can remove from about 0% to about 10%, from about 10% to about 20%, from about 20% to about 30%, from about 30% to about 40%, from about 40% to about 50%, from about 50% to about 60%, from about 60% to about 70%, from about 70% to about 80%, from about 80% to about 90%, or from about 90% to about 99.9% of a first contaminant present in the collected volume of bulk material. Specific examples of percentage removal includes about 0%, about 5%, about 10% about 15%, about 20%, about 30%, about 45%, about 50%, about 60%, about 70%, about 75%, about 80%, about 85%, about 90%, about 95%, about 99%, and ranges between any two of these values. In some embodiments, removal of at least some of the cleaning fluid from the passage and/or casing also removes at least some of multiple contaminants. Removal of at least some of the cleaning fluid from the passage and/or casing can remove from about 0% to about 10%, from about 10% to about 20%, from about 20% to about 30%, from about 30% to about 40%, from about 40% to about 50%, from about 50% to about 60%, from about 60% to about 70%, from about 70% to about 80%, from about 80% to about 90%, or from about 90% to about 99.9% of at least one of the multiple contaminants present in the collected volume of bulk material. Specific examples of percentage removal includes about 0%, about 5%, about 10% about 15%, about 20%, about 30%, about 45%, about 50%, about 60%, about 70%, about 75%, about 80%, about 85%, about 90%, about 95%, about 99%, and ranges between any two of these values. In some embodiments in which at least some of multiple contaminants is being removed, different amounts of different contaminants can be removed. In some embodiments, removal of the cleaning fluid includes removing at least some of the bulk material.

In some embodiments, inserting the first end 114 of the casing 102 into a bulk material includes applying a rotational force to the casing 102. In some embodiments, the rotational force serves to screw the casing into the material (e.g., soil). In some embodiments, removing is performed manually. In some embodiments, inserting is performed using a drilling machine. For example, a crawler drill can be used. Other drilling machines, such as a pneumatic drill, are also contemplated. The particular type of motor or drilling machine used can be selected based on considerations such as the desired depth of material to be treated, the desired volume of material, the desired area of material to be treated, the level of contamination of the material, and the properties of the material to be treated. For example, the motor being used to rotate the casing 102 into the material can be capable of boring to the desired depth. Crawler drills can advantageously be capable of drilling up to 30 m underground. In some embodiments, a machine including arrayed drills can be used for insertion. In some embodiments, an auger can be employed for insertion. In some embodiments, axial vibration could be used for insertion (e.g., a vibro-hammer). In some embodiments, one can employ a pilling or a pressing machine.

In some embodiments, the process of adding a cleaning fluid into the passage, agitating the casing, and removing at least some of the cleaning fluid from the passage can be repeated more than once. Repeating this series of steps can advantageously increase the amount of contaminants collected from the material.

In some embodiments, the method can further include removing the casing from the bulk material. In some embodiments, removing the casing includes applying a rotational force in a direction opposite to the rotational force used to insert the casing. In some embodiments, removing the casing can be performed manually. In some embodiments, removal can be performed using a drilling machine. The drilling machine can be the same machine used to insert the device. In some embodiments, the drilling machine can be a different machine from the machine used to insert the device.

In some embodiments, insertion or removal of the device 100 can become challenging or difficult. This difficulty can arise from a number of factors including material getting clogged within the passage 104 and hardened material surrounding the passage 104. Agitating the device 100 manually or with a motor can advantageously aid in removal and insertion of the device. Agitating the device 100 can aid in removal and insertion of the device 100 because in can help to break up any clumps or hardened section present in the material or bulk material.

Figure 3:
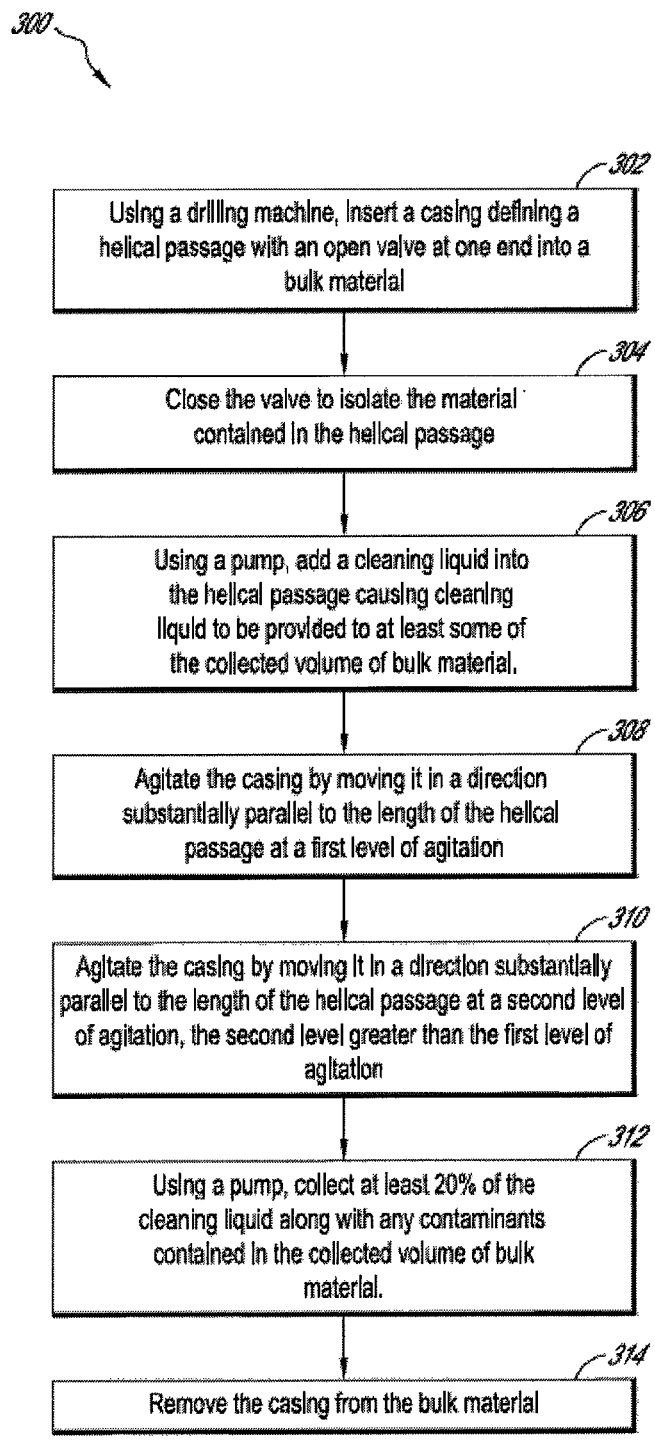
FIG. 3 depicts a flow chart outlining some embodiments for agitating a material.

FIG. 3 depicts some embodiments of a method 300 for cleaning a material. The method 300 includes using a drilling machine to insert a casing defining a helical passage 102 into a bulk material (block 302). The casing includes a valve configured to open and close the casing at a first end of the casing. The valve is open during insertion. In some embodiments, the method 300 includes closing the valve to isolate the material collected in the helical passage (block 304). In some embodiments, the method 300 includes using a pump to add a cleaning fluid into the helical passage causing cleaning fluid to be provided to at least some of the collected volume of bulk material (block 306). In some embodiments, the method 300 includes agitating the casing by moving it in a direction substantially parallel to the length of the helical passage at a first level of agitation (block 308). In some embodiments, the method 300 includes agitating the casing by moving it in a direction substantially parallel to the length of the helical passage at a second level of agitation, the second level greater than the first level of agitation (block 310). In some embodiments, the method 300 includes using a pump to collect at least 20% of the cleaning fluid along with any contaminants contained in the collected volume of bulk material (block 312). In some embodiments, the method 300 can include removing the casing from the bulk material (block 314).

Additional Exemplary Embodiments and Aspects

As noted above, in some embodiments, the casing can be conical. Other shapes, such as rectangular are also possible. In some embodiments, the casing can increase in diameter as one progresses down the length of the casing to the opening. In some embodiments, the casing can decrease in diameter as one progresses down the length of the casing to the opening. In some embodiments, the casing can be conical in shape.

In some embodiments, the casing can include agitating features or structures within it. In some embodiments, these features can be structures or arms along the side or extending from a center of the casing, so as to allow efficient agitation of the soil or material within the casing.

Figures 4A, 4B:
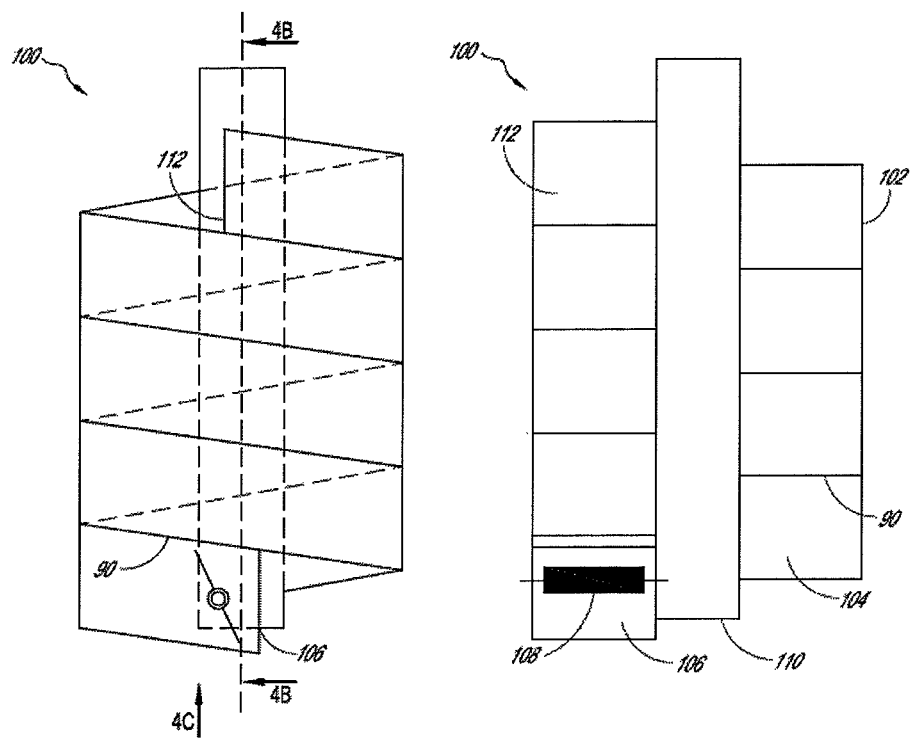
FIG. 4A is a drawing depicting a side view of some embodiments of a casing.
FIG. 4B is a drawing depicting a sectional view as indicated in FIG. 4A.
Figure 4C:
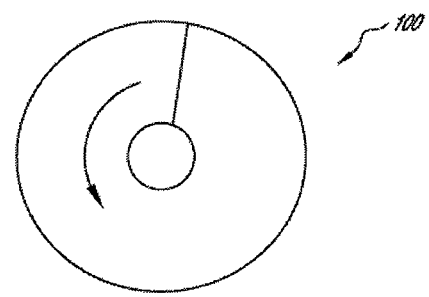
FIG. 4C is a drawing depicting a bottom up view, as indicated in FIG. 4A.

In some embodiments, the casing includes a helically shaped passage 104, defined by dividing walls, within the casing 102. In some embodiments, this allows for a more efficient or even distribution of the added cleaning fluid or other substance to the inside of the device. In some embodiments, the added structure and/or surface area allows for a more even and/or effective distribution of force to the material within the device. In some embodiments, the surface of the helical passage is solid, so as to allow the cleaning fluid or other substance to flow throughout the casing in a more even manner. In some embodiments, the shape can be that depicted in the drawings in FIGS. 4A-4C. In some embodiments, where there is, for example, a passage 104, one or more dividing walls 90, can be in place to define the passage within the casing 102. In some embodiments, the dividing wall 90 can be liquid and/or gas tight from one length of the device to the other. In some embodiments, the dividing wall 90 can be porous. In some embodiments, the dividing wall 90 can be replaced by rods, plates, ridges, grates, screens, and/or need not be present at all.

FIGS. 5A-5C depict additional optional shapes for some embodiments provided herein. In some embodiments, the casing and/or device and/or helical passage (if present) can include a shape that is conical and/or similar to that of a univalve shell. As shown in FIG. 5A, the shape can generally change the diameter of the casing and/or the helical passage. In some embodiments, the helical passages provide the outer shell of the casing, and the casing itself can thereby be threaded, for ease of insertion into a material. In some embodiments, the structure in FIG. 5A can be inserted with the opening at the bottom of the photo into the soil, where the opening can include a valve. There can be an optional opening towards the opposite end of the structure (which is not shown). In some embodiments, the structure in FIG. 5A can be inserted with the smaller diameter end into the material. The valve, as well as an additional opening, can then added to the smaller end of the shape. FIG. 5B shows a cross-sectional view of the structure in FIG. 5A. FIG. 5C shows an enlarged view of the structure in FIG. 5B.

Figure 6:
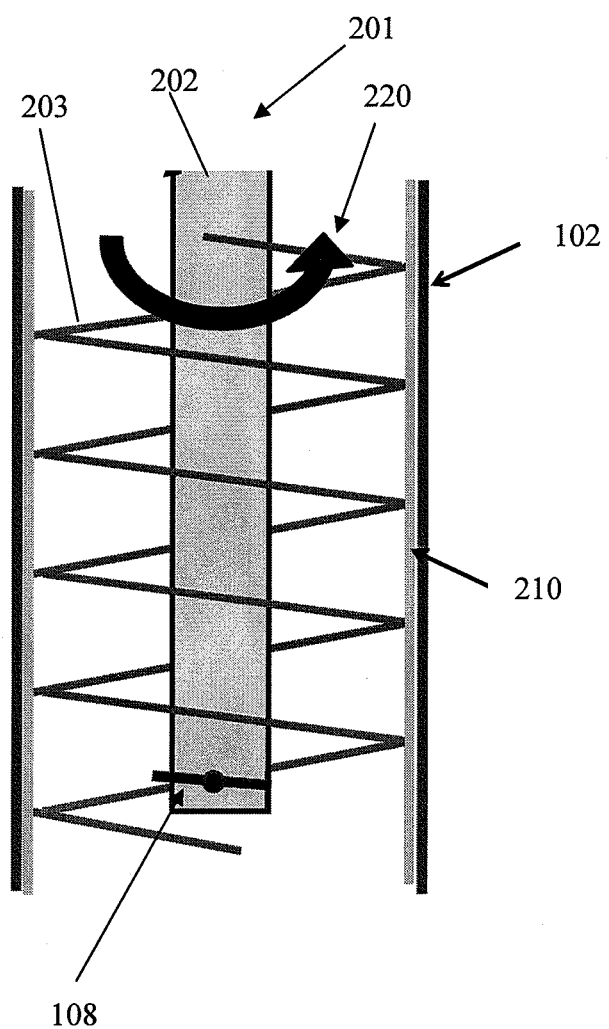
FIG. 6 is drawing depicting some embodiments of a casing and a separately moveable internal drill-bit.

FIG. 6 depicts some embodiments in which the casing 102 can be separate from an inner bit and/or boring aspect 201. In some embodiments, the outer casing 102 and/or inner bit 201 can move separately. In some embodiments, there can be a seal 210 between the inner bit 201 and the outer casing 210. In some embodiments, the seal can include a brush type arrangement, so that the outer blade of the bit can rotate, while keeping an adequate seal (or at least reducing the rate at which a fluid leaves). In some embodiments, the brush can be made of polymer or metal. In some embodiments, the brush can be coated with hydrophobic polymers so as to create a more effective seal. In some embodiments, the bit 201 can include a center rod or core 202 and one or more blades 203 that extends from the core towards the inner side of the casing 102. In FIG. 6, the bit is shown as having an outer cutting blade. In some embodiments, any bit arrangement can be employed, including twist and/or lip and spur bits.

In some embodiments, there are ridges on the external surface of the device and/or casing and/or helical passage that also assist as threads for insertion of the device into a material.

In some embodiments, the rod 110, can add structural support to the device, or allow the helical passage to wrap around a center core. In some embodiments, the rod is configured so as to allow a fluid to travel down the rod and into various sections of the helical passage along the length of the device, thereby increasing the distribution of the liquid. In some embodiments, the rod can supply power and/or energy to the valve 108 (e.g., electrical, mechanical, hydraulic, etc).

In some embodiments, any part of the device can be made of any appropriate material. In some embodiments, the casing and/or dividing walls or other structures can be from environmentally friendly materials having sufficient strength. In some embodiments, the device can include iron, cast iron, carbon steel, titanium, carbon-fiber materials, glass-fiber materials, or high-speed steel. In some embodiments, the casing and/or helical passage can be made of any material that can bear the mechanical pressure when screwed into the material and/or the stress caused by the relevant vibrations.

In some embodiments, the valve can be open and/or closed by a variety of approaches. In some embodiments, it can be done electrically. In some embodiments, it can be done hydraulically.

The device can be inserted into the soil in a variety of ways. For example, in some embodiments, this can be achieved by joining the helical tool to the tip of a crawler drill or pneumatic drill. The drill can then be used to insert the device into the soil. In some embodiments, the drill can allow for boring to a depth of 30 meters or more underground. In some embodiments, it is desirable to select a boring machine in accordance with the level of soil contamination, the depth and area of the soil requiring decontamination, and the soil properties. In some embodiments, a self-propelled boring machine can be used to move through contaminated areas.

A variety of mechanisms and approaches can be used to provide movement or vibrations to the device, when desired. In some embodiments a vibro-hammer can be employed. Such a system can be effective because it can also be used for embedding the tool (softening the soil to facilitate embedding) and removing the tool (loosening the soil to facilitate the removal of the tool). In some embodiments, the vibration device can provide a frequency of vibration from 0 to 300 Hz, e.g., 1, 5, 10, 20, 30, 40, 50, 60, 70, 80, 90, 100, 120, 150, 200, 250, or 300 Hz or more, including any range defined from any two of the preceding values and any range above or below any of the preceding values. In some embodiments, the vibration device provides the amount of force for the particular application. In some embodiments, this can be, for example, from 1 to 1000 kN, e.g., 1, 5, 10, 50, 100, 200, 300, 400, 474, 500, 600, 700, 800, 900, or 1000 kN, including any range defined within any two of the preceding values and any range above or below any one of the preceding values.

One of skill in the art is able to determine what type and how much of a cleaning fluid or substance is to be added to the casing. In some embodiments, the substance is not a liquid, but is a solid, gas, or plasma. In some embodiments, the cleaning fluid can include a surfactant. In some embodiments, environmentally friendly cleaning fluids capable of removing hydrophobic contaminants can be employed. By using such cleaning fluid, a wide range of soil contaminations, including heavy metals and hazardous organics can be treated. In some embodiments, the cleaning fluid or other substance can be hazardous to the environment or water table. In some embodiments, the cleaning fluid or other substance can be toxic, and thus, reducing the amount of such a toxic material that leaks out of the area to be treated can be advantageous.

In some embodiments, the appropriate pump for adding a cleaning fluid or other substance to the casing and/or removing the cleaning fluid or other substance from the casing can be selected upon the particular conditions of use and desired outcome. In some embodiments, a standard pump for spraying water can be used to add the cleaning fluid. In some embodiments, liquid collection can be performed by the same or a different pump (or no pump). In some embodiments, a suction pump can be employed for removing any resulting liquid.

In some embodiments, some of the embodiments provided herein can be used for soil decontamination with microorganisms (bioremediation) and/or plants (phytoremediation). In some embodiments, some of the embodiments provided herein can be used to disperse adsorbing agents, fixing agents, and/or methods of dispersing cleaning fluids (or other substances). In some embodiments, some of the embodiments described herein can be used to add additional materials to a sample of soil. In some embodiments, the methods provided herein can assist with reliability and swiftness of material processing. In some embodiments, the methods and devices provided herein allow for a greater degree of purification. For example, in some embodiments, the extent of purification is at least 1, 5, 10, 11, 12, 13, 14, 15, 16, 17, 18, 19, 20, 21, 22, 23, 24, 25, 26, 27, 28, 29, 30, 31, 32, 33, 34, 35% or higher beyond what a cleaning process without the sealed casing (or a closed valve) would achieve. In some embodiments, this is due to the ability to collect that amount more of the cleaning fluid.

In some embodiments, the extent of purification is at least 1, 5, 10, 11, 12, 13, 14, 15, 16, 17, 18, 19, 20, 21, 22, 23, 24, 25, 26, 27, 28, 29, 30, 31, 32, 33, 34, 35% or higher beyond what a cleaning process without the sealed casing (or a closed valve) would achieve. In some embodiments, this is due to the ability to keep the cleaning fluid in contact with the specified section of soil for a longer period of time.

In some embodiments, the greater recover allows for a greater degree of recycling for the cleaning fluid or other additive. In some embodiments, one can recycle at least 1, 5, 10, 11, 12, 13, 14, 15, 16, 17, 18, 19, 20, 21, 22, 23, 24, 25, 26, 27, 28, 29, 30, 31, 32, 33, 34, 35% or higher of the cleaning fluid added.

In some embodiments, the greater recover allows for a greater degree of isolation of the cleaning fluid from the bulk soil or other material. In some embodiments, one can reduce the amount of cleaning fluid (or other additive) that leaves the treated area by recycle at least 1, 5, 10, 11, 12, 13, 14, 15, 16, 17, 18, 19, 20, 21, 22, 23, 24, 25, 26, 27, 28, 29, 30, 31, 32, 33, 34, 35% or higher of the cleaning fluid added.

In some embodiments, the long-term reliability of soil remediation can increase because a large amount of the hazardous substances are removed.

In some embodiments, the devices and methods provided herein can avoid the use of an off-site method in which the soil to be treated is transported to a plant where the soil is decontaminated and then returned to the original location. In some embodiments, the devices and methods provided herein can avoid an on-site method in which cleaning fluid is dispersed directly onto the soil and then collected by specific means. In some embodiments, the devices and methods provided herein can reduce cost and time required for soil processing. In some embodiments, the devices and methods provided herein can allow for a more ready collection of the cleaning fluid, as it does not spread as widely throughout the soil.

In some embodiments, the devices and methods described herein can advantageously overcome one or more of the deficiencies found in current methods for soil decontamination. In some embodiments, because the casing includes a seal in the form of the valve, adverse effects such as the spreading of the contamination by leakage of the cleaning fluid to the surrounding soil, liquefaction of the surrounding soil, and ground sinking, can be reduced. In some embodiments, one or more of these can be reduced by at least 1, 2, 3, 4, 5, 10, 15, 20, 30, 40, 50, 60, 70, 80, 90, 95, 96, 97, 98, 99, or 100%, including any range within any two of the preceding values and any range above any one of the preceding values. In some embodiments, the cleaning fluid flows along the optional passage and can result in being dispersed within the material in a uniform manner. In some embodiments, the inducement of liquefaction can cause the cleaning fluid to be discharged from a top end of the casing, which can aid in collection of the cleaning fluid. In some embodiments, the optional passage has a large surface area that can allow for a more uniform, relatively strong agitation to be applied to material collected within the passage. In some embodiments, because the material is softened during insertion of the device, lower levels energy can be used to apply uniform, strong agitation to material collected within the passage. In some embodiments, 1, 2, 3, 4, 5, 10, 15, 20, 25, 30, 50, 70, or 90% less energy can be used for this. In some embodiments, because the casing is agitated in a direction substantially parallel to a length of the passage, the effect of agitation on surrounding soil can be reduced.

A variety of variables and factors can be taken into account when determining how much the material should be vibrated for the initial mixing process. In some embodiments, the soil is vibrated with a force small enough that liquefaction, which is described below, does not occur. In this way, the contaminants attached to the soil particles can be easily separated from the soil particles by friction. In some embodiments, that vibration is effective for separating contaminants attached to soil particles. This allows the soil particles to collide with each other, forming new gaps between the soil particles, increasing the size of existing gaps, and damaging the framework of the cohesive soil, and the soil particles grind against each other, detaching the contaminants attached to the surface of the soil particles from the surface.

In some embodiments, liquefaction is desired at some point in the process. In some embodiments, liquefaction can be caused by vibration and allow for the collection of the cleaning fluid at a surface of the collected material within the casing and/or passage. In some embodiments, when soil containing water is vibrated, the water pressure in the soil increases, causing the water to be discharged at the ground surface. This phenomenon is known as liquefaction and can be applied in some of the present embodiments. For example, in some embodiments, after the soil is dug up by inserting the helical tool, and the porosity (proportion of air content) of the soil increases and after injecting the cleaning fluid, so that the water content of the soil increases, one can strongly vibrate the soil so that liquefaction is forcefully induced and causes the cleaning fluid to be discharged for collection. In some embodiments, by repeating the steps of injecting cleaning fluid, applying vibrations, and discharging and collecting the cleaning fluid, contaminants in the soil can be collected. The amount and type of force for liquefaction for various materials can be determined by those of skill in the art, in light of the present disclosure. For example, in soil having a relative density of 53% (equivalent to soil containing water), liquefaction occurs by applying vibration of 2 Hz and an acceleration of 80 Gal. One Gal is equal to 0.01 m/s$^2$. If the soil to be decontaminated weighs 500 t and is vibrated at 80 Gal, a vibrating force (vibratory force) of 500×1000×80×0.01=400000 kgm/s$^2$=400000 N=400 kN≈40000 kgf is required. In some embodiments, this can be delivered via a Vibro-Hammer described, which has a vibrating force of 473 kN and is thus capable of applying sufficient vibration to 500 t of soil. In some embodiments, since the density of sand is approximately 2.0 g/cm$^3$, the volume of 500 t of sand is 500×1000×1000/2.0=2.5×10$^8$ cm$^3$=250 m$^3$. When the casing has a radius of 5.7 m and a length of approximately 10 m, the volume of the soil that can be decontaminated is approximately 250 m$^3$. This treatable volume is sufficient for one treatment. The water flow generated by liquefaction follows the device to the ground surface. A suction pump can be installed at an outlet to suck up the cleaning fluid containing contaminants. Since the cleaning fluid, when injected, flows along the lower surface of the helical passage and is discharged along the upper surface of the helical passage due to the effect of internal water pressure generated by liquefaction, the cleaning fluid containing contaminants can be gradually replaced by fresh cleaning fluid.

In some embodiments, the tool can be easily removed from the soil by using the drill (e.g., a crawler drill) used for insertion by turning the tool in the direction opposite to that of insertion. In some embodiments, when removal is difficult due to clogging of sand inside the tool, removal can be facilitated by vibrating the tool using the vibration exciter used for decontamination. In some embodiments, appropriately vibrating the tool while embedding it also facilitates the embedding process.

EXAMPLES

Example 1

Decontamination of Soil

The present example outlines some embodiments of decontaminating soil. A device in accordance with the embodiment described with FIG. 1 is provided, and a crawler drill is used to rotationally insert the first end of the casing of the device into the soil. The valve is open during insertion of the device. The casing is inserted into the soil up until the second end of the casing is about level with the soil. The valve is then closed, thereby defining a volume of soil within the passage. A cleaning fluid to chelate a metal is injected into the casing. The casing is then agitated at a frequency of 1 Hz at an acceleration of 40 Gal to help remove contaminants from soil particles. The casing is then agitated at a frequency of 2 Hz at an acceleration of 80 Gal to induce liquefaction and cause the cleaning fluid along with at least some of the metal contaminants present in the collected soil to rise to the top of the casing above the surface of the soil. The cleaning fluid along with any contaminants contained therein is then collected through the second opening. At least 20% of the cleaning fluid injected into the passage is collected, thereby increasing the amount of cleaning fluid recovered during the treatment, which in turn increases the effectiveness of the cleaning process, as an increase in the amount of cleaning fluid recovered will result in an increase in the amount of contaminant recovered.

Example 2

Decontamination of Mud

The present example outlines a method of reducing the amount of cleaning fluid that leaks into a bulk area of mud. The device includes a casing that includes a first opening at a first end of the casing and a second opening at a second end of the casing. The casing includes a valve configured to open and close the first opening. The valve is open during insertion of the device. The casing is inserted into the soil. The valve is then closed, collecting a volume of mud within the casing. A cleaning material (solid, liquid, gas, or plasma) is then added to the material in the casing. The casing is then agitated at a frequency of 0.5 Hz at an acceleration of 40 Gal to help separate contaminants from mud. The casing is then let sit, so as to allow the mud to settle and the cleaning fluid along with at least some of the contaminants present in the collected mud to rise to the top of the casing. The cleaning fluid along with any contaminants contained therein is then collected through the second opening using an air vacuum pump. At least 20% of the cleaning material added into the casing is collected. The casing is then removed from the mud.

Example 3

Cleaning Sand

The present example outlines some embodiments for decontaminating sand. A casing defining an inner volume is inserted into the sand. The casing has a valve at the lower end, which, while open during insertion, is closed once inserted, providing a volume of sand within the casing that is relatively isolated from the surrounding bulk volume of sand. A cleaning fluid to treat oil is dumped into the contained sand. The casing is then agitated at a frequency of 1 Hz at an acceleration of 30 Gal to help remove contaminants from soil particles. The casing is then agitated at a frequency of 2 Hz at an acceleration of 90 Gal to induce liquefaction and cause the cleaning fluid along with at least some of the oil contaminants present in the collected sand to rise to the top of the casing above the surface of the sand. The cleaning fluid along with any oil contaminants contained therein is then collected through a second opening. At least 25% of the cleaning fluid injected into the passage is collected, thereby increasing the amount of cleaning fluid recovered during the treatment.

Example 4

Method of Collecting Oil

The present example outlines some embodiments of collecting oil from shale. A casing defining an inner volume is inserted into the oil laden shale. The casing has a valve at the lower end, which, while open during insertion, is closed once inserted, providing a volume of shale within the casing, that is relatively isolated from the surrounding bulk volume of shale. Water is dumped into casing as the shale within the casing is vibrated to further crush and/or pulverize the shale. The casing is then agitated at a frequency of 2 Hz at an acceleration of 90 Gal to induce liquefaction and cause the water and any oil in the shale to rise to the top of the casing above the surface of the soil. The oil is then collected off of the top of the water at the top of the casing.

Example 5

Recycling of Cleaning Materials

The present example outlines some embodiments for recycling a cleaning material. A device having an outer casing and an inner helical passage is rotationally inserted into the soil. The valve is open during insertion of the device. The valve is then closed, thereby defining a volume of soil within the passage. A recyclable cleaning material is added to the volume of soil in the casing. The casing is then agitated at a frequency of 1 Hz at an acceleration of 40 Gal to help remove contaminants from soil particles. The casing is then agitated at a frequency of 2 Hz at an acceleration of 80 Gal to induce liquefaction and cause the recyclable cleaning fluid along with at least some of the contaminants present in the collected soil to rise to the top of the casing. The recyclable cleaning material, along with at least some contaminants contained therein is then collected. The recyclable cleaning material is then processed to remove or reduce an amount of contaminant in it. The device can be removed and inserted into a second area of soil. The recycled cleaning material is then applied to this second area of soil. The method will allow for at least 15% of the recyclable cleaning material to be recycled at least once.

Example 6

Isolated Biological Treatment

The present example outlines some embodiments of performing a biological treatment on soil. A device in accordance with the embodiment described with FIG. 1 is provided, and a crawler drill is used to rotationally insert the first end of the casing of the device into the soil. The valve is open during insertion of the device. The casing is inserted into the soil up until the second end of the casing is about level with the soil. The valve is then closed, thereby defining a volume of soil within the passage. A cell suspension is then added to the sealed volume of soil. The casing is then agitated at a frequency of 1 Hz at an acceleration of 40 Gal to help remove contaminants from soil particles and to mix the soil with the cell culture. If needed, gas can be pumped into the mixture to aerate the mix. The casing is then agitated at a frequency of 2 Hz at an acceleration of 80 Gal to induce liquefaction and cause at least part of the cell culture to rise to the top of the casing above the surface of the soil. The top solution can then be collected. At least 25% of the cell culture injected into the passage is collected, thereby decreasing the effect of the added cells on any cellular life in the surrounding soil. In the alternative, the cell culture can be replaced with an enzyme mix, a virus mix, or other biological product.

Example 6

Injecting Materials Into a Section Soil

The present example outlines some embodiments of adding a material to a volume of soil. A casing is inserted into soil. The casing has a valve at its lower end, which is open during insertion of the device. The valve is closed once the casing is at the desired depth, thereby defining a volume of soil within the casing. An ingredient to be evenly mixed with a specific volume of soil is added to the sealed volume of soil. The casing is then agitated at a frequency of 1 Hz at an acceleration of 40 Gal to help mix the ingredient with the particular volume of soil. The casing can then be removed, thereby allowing an ingredient to be added and mixed with a specific volume of soil. In the alternative, prior to removal of the casing, a second ingredient can be added to the casing. The second ingredient can, for example, either react with or neutralize the first ingredient, thereby allowing both the addition of an ingredient, and/or a reaction to occur in the soil, in its bulk environment.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as “open” terms (e.g., the term “including” should be interpreted as “including but not limited to,” the term “having” should be interpreted as “having at least,” the term “includes” should be interpreted as “includes but is not limited to,” etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A device for agitating a material, the device comprising:
   a casing defining a passage, wherein the casing comprises an opening at a first end of the casing, wherein the passage is helical; and
   a valve positioned and configured to close the opening,
   wherein the casing is configured to allow rotational insertion of the casing into a material, wherein the valve is configured to allow closure of the passage when the casing is in the material, and wherein the casing is configured to be agitated when the casing is in the material.

2. The device of claim 1, further comprising an opening at a second end of the casing.

3. The device of claim 2, wherein the opening at the second end of the casing is in fluid communication with a reservoir.

4. The device of claim 3, further comprising a cleaning fluid in the reservoir.

5. The device of claim 1, wherein the valve is configured to provide a liquid tight seal for the opening.

6. The device of claim 1, wherein the valve comprises a butterfly valve.

7. The device of claim 1, wherein the first end of the casing is configured for insertion into a material to be agitated.

8. The device of claim 7, wherein the first end of the casing comprises a material that is structurally rigid enough to allow the first end of the casing to bore into soil.

9. The device of claim 1, further comprising a motor configured to rotate the casing into the material to be agitated.

10. The device of claim 1, further comprising a cleaning fluid within at least a portion of the passage.

11. A device for agitating a material, the device comprising:
    a casing defining a passage, wherein the casing comprises an opening at a first end of the casing;
    a valve positioned and configured to close the opening; and
    a rod, wherein the passage is wound along a length of the rod,
    wherein the casing is configured to allow rotational insertion of the casing into a material, wherein the valve is configured to allow closure of the passage when the casing is in the material, and wherein the casing is configured to be agitated when the casing is in the material.

12. The device of claim 11, further comprising an opening at a second end of the casing.

13. The device of claim 12, wherein the opening at the second end of the casing is in fluid communication with a reservoir.

14. The device of claim 13, further comprising a cleaning fluid in the reservoir.

15. The device of claim 11, wherein the valve is configured to provide a liquid tight seal for the opening.

16. The device of claim 11, wherein the valve comprises a butterfly valve.

17. The device of claim 11, wherein the first end of the casing is configured for insertion into a material to be agitated.

18. The device of claim 17, wherein the first end of the casing comprises a material that is structurally rigid enough to allow the first end of the casing to bore into soil.

19. The device of claim 11, further comprising a motor configured to rotate the casing into the material to be agitated.

20. The device of claim 11, further comprising a cleaning fluid within at least a portion of the passage.

21. A method for agitating a material, the method comprising:
- inserting a first end of a casing defining a helical passage into a bulk material to be agitated, the casing comprising:
    - an opening at the first end of the helical passage; and
    - a valve configured to open and close the opening at the first end of the helical passage,
    - wherein the valve is open during inserting so as to allow for a collected volume of the bulk material to pass into the helical passage;
- closing the valve;
- adding a cleaning fluid into the helical passage; and
- agitating the casing.

22. The method of claim 21, wherein agitating comprises moving the casing in a direction substantially parallel to a length of the helical passage.

23. The method of claim 21, wherein adding a cleaning fluid provides cleaning fluid to the collected volume of bulk material.

24. The method of claim 21, wherein inserting comprises applying a rotational force to the casing.

25. The method of claim 24, wherein the rotational force serves to screw the casing into the soil.

26. The method of claim 21, wherein agitating comprises:
- agitating the helical passage in a direction substantially parallel to a length of the helical passage at a first level of agitation; and
- agitating the helical passage in a direction substantially parallel to the length of the helical passage at a second level of agitation, wherein the second level of agitation is greater than the first level of agitation.

27. The method of claim 21, wherein agitating causes water pressure within the collected volume of the bulk material to increase.

* * * * *

UNITED STATES PATENT AND TRADEMARK OFFICE
CERTIFICATE OF CORRECTION

Page 1 of 2

PATENT NO. : 8,845,233 B2
APPLICATION NO. : 13/517974
DATED : September 30, 2014
INVENTOR(S) : Kusuura It is certified that error appears in the above-identified patent and that said Letters Patent is hereby corrected as shown below:

On the Title Page

On Page 2, in Item (56), under "OTHER PUBLICATIONS", in Column 1, Lines 6-12, delete "Cast Iron (in Japanese) "Casting database" in "Processing technology database" from the web site of The National Institute of Advanced Industrial Science and Technology (AIST); http://unit.aist.go.jp/dmrc/db☐dmrc/casting/gairon/text 06.htm; in some form no later than Aug. 26, 2011. While a copy of the website as it existed on Aug. 26, 2011, is not in Applicant's possession, Applicant has provided a copy of the website that was printed on May 7, 2012.".

On Page 2, in Item (56), under "OTHER PUBLICATIONS", in Column 1, Lines 33-38, delete "Mitsubishi crawler drill MDC10 II from the website of Ems Co., Ltd. (in Japanese); http://www.ems☐esd.co.jp/lineup/mitsubishi/mcd102.html; in some form no later than Aug. 26, 2011. While a copy of the website as it existed on Aug. 26, 2011, is not in Applicant's possession, Applicant has provided a copy of the website that was printed on May 7, 2012.".

On Page 2, in Item (56), under "OTHER PUBLICATIONS", in Column 1, Line 42, delete "webiste" and insert -- website --, therefor.

On Page 2, in Item (56), under "OTHER PUBLICATIONS", in Column 2, Lines 14-21, delete "Liquefaction Intensity Characteristics of Sand Based on Shaking Table Test (in Japanese); Katsuhiko Oka, Osaka City University, Department of Urban Engineering, Laboratory of Geotechnical. Engineering http://geo.civil.eng.osaka☐cu.ac.jp/ronbun/soturonpdf/02oka.pdf; in some form no later than Aug. 26, 2011. While a copy of the website as it existed on Aug. 26, 2011, is not in Applicant's possession, Applicant has provided a copy of the website that was printed on Sep. 15, 2011.".

On Page 2, in Item (56), under "OTHER PUBLICATIONS", in Column 2, Lines 29-35, delete "Earthquake Waveform and Frequency Characteristics from the website of the Japanese Signed and Sealed this
Tenth Day of March, 2015

Michelle K. Lee
*Deputy Director of the United States Patent and Trademark Office*

Meteorological Research Institute; http://www.mri-jma.go.jp/Publish/Technical/DATA/VOL 26/26 093.pdf; in some form no later than Aug. 26, 2011. While a copy of the website as it existed on Aug. 26, 2011, is not in Applicant's possession, Applicant has provided a copy of the website that was printed on May 7, 2012.".

On Page 2, in Item (56), under "OTHER PUBLICATIONS", in Column 2, Lines 62-63, delete "http://www.mri-jma.go.jp/Publish.Technical.DATA/VOL" and
insert -- http://www.mri-jma.go.jp/Publish/Technical/DATA/VOL --, therefor.

On Page 2, in Item (56), under "OTHER PUBLICATIONS", in Column 2, Lines 67-71, delete "Butterfly valve catalogue from the website of suiryoku.com; http://www.suiryoku.com/g v/v butter/butter.html; in some form no later than Aug. 26, 2011. While a copy of the website as it existed on Aug. 26, 2011, is not in Applicant's possession, Applicant has provided a copy of the website that was printed on Sep. 15, 2011.".

On Page 3, in Item (56), under "OTHER PUBLICATIONS", in Column 1, Lines 7-20, delete "Agricultural spray pump from the website of Kudira, a specialty farm equipment supplier (in Japanese); http://www.kudira.netISHOP/km25.html; in some form no later than Aug. 26, 2011. While a copy of the website as it existed on Aug. 26, 2011, is not in Applicant's possession, Applicant has provided a copy of the website that was printed on Sep. 15, 2011. Air vacuum pump, from the website of Aqua System Co., Ltd.; http://www.agsys.co.jp/news/Blja/%E3%BO%BA%E3%B2%AB%E3%B2%A2%E3%B3%90%E3%-B2%AD%E3%B3%A5%E3%B3%BC%E3%B3%AO%E3%B3%9D%E3%B3%B3%E3%B3%97%E3%BO%BB.htm; in some form no later than Aug. 26, 2011. While a copy of the website as it existed on Aug. 26, 2011, is not in Applicant's possession, Applicant has provided a copy of the website that was printed on Sep. 15, 2011.".

On Page 3, in Item (56), under "OTHER PUBLICATIONS", in Column 2, Lines 18-25, delete "Current and Prospective Soil Decontamination Business (in Japanese), Sumitomo Trust and Banking Co., Ltd., Industrial Research Report No. 14, Sumitomo Trust and Banking, Research Department; http://www.sumitomotrust.co.jp/RESIresearch/PDF2/Ind14.pdf; in some form no later than Aug. 26, 2011. While a copy of the website as it existed on Aug. 26, 2011, is not in Applicant's possession, Applicant has provided a copy of the website that was printed on Sep. 15, 2011.".

In the Specification

In Column 2, Line 25, delete "is drawing" and insert -- is a drawing --, therefor.

In Column 4, Line 15, delete "lowcost" and insert -- low-cost --, therefor.

In Column 12, Line 24, delete "seal 210" and insert -- seal 220 --, therefor.